United States Patent
Chen et al.

(10) Patent No.: US 10,437,405 B2
(45) Date of Patent: Oct. 8, 2019

(54) FIRST AND SECOND ELECTRODE OPTIMIZATION FOR A TOUCH PANEL

(71) Applicant: AU Optronics Corporation, Hsin-Chu (TW)

(72) Inventors: Ya-Ting Chen, Hsin-Chu (TW); Sheng-Wen Cheng, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/938,095

(22) Filed: Mar. 28, 2018

(65) Prior Publication Data

US 2019/0187825 A1 Jun. 20, 2019

(30) Foreign Application Priority Data

Dec. 15, 2017 (TW) .............................. 106144111 A

(51) Int. Cl.
*G06F 3/044* (2006.01)
*G06F 3/041* (2006.01)

(52) U.S. Cl.
CPC .......... *G06F 3/0448* (2019.05); *G06F 3/0443* (2019.05); *G06F 3/0446* (2019.05); *G06F 3/0412* (2013.01); *G06F 2203/04103* (2013.01); *G06F 2203/04111* (2013.01); *G06F 2203/04112* (2013.01)

(58) Field of Classification Search
CPC ...... G06F 3/0448; G06F 3/044; G06F 3/0445; G06F 3/0446; G06F 2203/04103; G06F 2203/04111; G06F 2203/04112; G06F 3/0443; G06F 3/0412
See application file for complete search history.

(56) References Cited

U.S. PATENT DOCUMENTS

| 8,519,967 | B2 | 8/2013 | Chien et al. | |
|---|---|---|---|---|
| 9,489,914 | B2* | 11/2016 | Ha | H05K 1/0274 |
| 10,296,153 | B2* | 5/2019 | Nakase | G06F 3/044 |
| 10,310,688 | B2* | 6/2019 | Xie | G06F 3/044 |
| 2005/0036091 | A1* | 2/2005 | Song | G02F 1/133707 349/129 |
| 2014/0085261 | A1* | 3/2014 | Lu | G06F 3/044 345/174 |
| 2014/0293163 | A1* | 10/2014 | Ju | G06F 3/044 349/12 |

(Continued)

FOREIGN PATENT DOCUMENTS

| CN | 104111759 A | 10/2014 |
|---|---|---|
| CN | 106249963 A | 12/2016 |
| TW | M523908 U | 6/2016 |

OTHER PUBLICATIONS

Taiwan Intellectual Property Office, "Office Action", dated Feb. 5, 2018.

*Primary Examiner* — Darlene M Ritchie
(74) *Attorney, Agent, or Firm* — WPAT, PC

(57) ABSTRACT

A touch panel includes a substrate, a plurality of first electrode series, and a plurality of second electrode series. The substrate has a first surface. The first electrode series are disposed on the first surface. Each of the first electrode series extends along a first direction and includes a plurality of first electrodes. The second electrode series are disposed on the first surface. Each of the second electrode series extends along a second direction and includes a plurality of second electrodes.

8 Claims, 4 Drawing Sheets

(56) References Cited

U.S. PATENT DOCUMENTS

| | | | |
|---|---|---|---|
| 2017/0108975 A1* | 4/2017 | Zhang | G06F 3/044 |
| 2017/0344141 A1* | 11/2017 | Lee | G06F 3/03547 |
| 2018/0275801 A1* | 9/2018 | Nakayama | G06F 3/044 |
| 2019/0004657 A1* | 1/2019 | Koudo | G06F 3/0412 |
| 2019/0008041 A1* | 1/2019 | Nakamura | H05K 1/0296 |
| 2019/0012011 A1* | 1/2019 | Wang | G06F 3/044 |
| 2019/0034010 A1* | 1/2019 | Lee | G06F 3/0412 |
| 2019/0051711 A1* | 2/2019 | Lee | G09G 3/3208 |
| 2019/0064964 A1* | 2/2019 | Choi | G06F 3/044 |

\* cited by examiner

FIRST AND SECOND ELECTRODE OPTIMIZATION FOR A TOUCH PANEL

BACKGROUND

Technical Field

The present invention relates to a touch panel, and in particular, to an embedded capacitive touch panel.

Related Art

A current market has a large demand for touch panels. In the technologies of the touch panels, because a capacitive touch panel has advantages such as high reliability and a high reaction speed, the technology of the capacitive touch panel becomes the main development technology. A structure of the capacitive touch panel usually includes a liquid crystal display module (LCM) at a lower layer, a cover lens as a protection layer at an upper layer, and a transparent conductive layer sandwiched between a liquid crystal panel and the cover lens. According to a composition manner between the liquid crystal panel, the cover lens, and the transparent conductive layer, the capacitive touch panel is classified into an out-cell capacitive touch panel and an embedded capacitive touch panel. In the out-cell capacitive touch panel, a sensing electrode is made on a substrate, and the substrate having the sensing electrode is attached to an outer surface of a display. Therefore, the out-cell capacitive touch panel increases a total thickness of the touch panel, which is unfavorable for the display to be thin and light. On the contrary, the embedded capacitive touch panel is combined with a display panel during manufacturing of the display panel, and the entire system is relatively thin and light. In addition, the cover lens only needs to be removed and changed when broken by an external force, and not any other component of the touch panel, for example, a transparent electrode, needs to be made again. Therefore, in comparison with the out-cell capacitive touch panel, the embedded capacitive touch panel has relatively low maintenance costs. In general, most touch panel technologies pursue thinning and lightness of touch panels. However, when it comes to a commercial display apparatus (for example, an automated teller machine) provided in a public occasion, it further needs to be considered whether the touch panel can withstand a relatively large external force in the long term. Therefore, currently, a good touch panel that can withstand an external force still needs to be developed, so that the product is more competitive.

SUMMARY

The present invention relates to an embedded capacitive touch panel that uses thick glass (for example, glass having a thickness of more than 3 mm) as a cover lens. An area of each of first electrodes and an area of each of second electrodes in the touch panel have a ratio relationship. Because the thick cover lens in the disclosure can protect the touch panel, when an external force is applied to the touch panel, it is relatively not easy for the touch panel to be broken. In addition, because the area of each of the first electrodes and the area of each of the second electrodes in the touch panel (for example, a ratio of the area of each of the first electrodes to the area of each of the second electrodes ranges from 0.37 to 0.41) have a ratio relationship, a relatively large induction signal can be obtained according to the ratio relationship, and a problem that an induction signal is insufficient due to use of the thick glass can be solved. Therefore, the touch panel in the disclosure can withstand a relatively large external force and an inductive effect is also excellent.

According to an aspect of the disclosure, a touch panel is provided. The touch panel comprises a substrate, a plurality of first electrode in a first series, and a plurality of second electrode in a second series. The substrate has a first surface. The first electrode series are disposed on the first surface. Each of the first electrode series extends along a first direction and comprises a plurality of first electrodes. The second electrode series are disposed on the first surface. Each of the second electrode series extends along a second direction and comprises a plurality of second electrodes. In a unit area of the touch panel, a relationship between an area of each of the second electrodes and an area of each of the first electrodes satisfies Formula 1 and Formula 2:

$$A_2 = R \times A_1 \qquad \text{Formula 1; and}$$

$$0.37 < R < 0.41 \qquad \text{Formula 2, wherein}$$

$A_1$ indicates the area of each of the first electrodes in the unit area, $A_2$ indicates the area of each of the second electrodes in the unit area, and R indicates a ratio of $A_2$ to $A_1$.

For a better understanding of the foregoing and other aspects of the present invention, embodiments are provided below with reference to the accompanying drawings to give detailed descriptions.

DETAILED DESCRIPTION

The present invention relates to an embedded capacitive touch panel that uses thick glass (for example, glass having a thickness of 3 to 5 mm) as a cover lens. When the touch panel is applied to a commercial display apparatus, even if an external force is applied to the touch panel for a long time, it is still relatively not easy for the touch panel to be broken. Therefore, the maintenance costs required due to destruction by an external force can be reduced. In addition, shapes of first electrodes and second electrodes and an area ratio of each of the first electrodes to each of the second electrodes in the touch panel in the disclosure are specially designed, so that the touch panel using thick glass can still have a good inductive effect.

Figure 1:
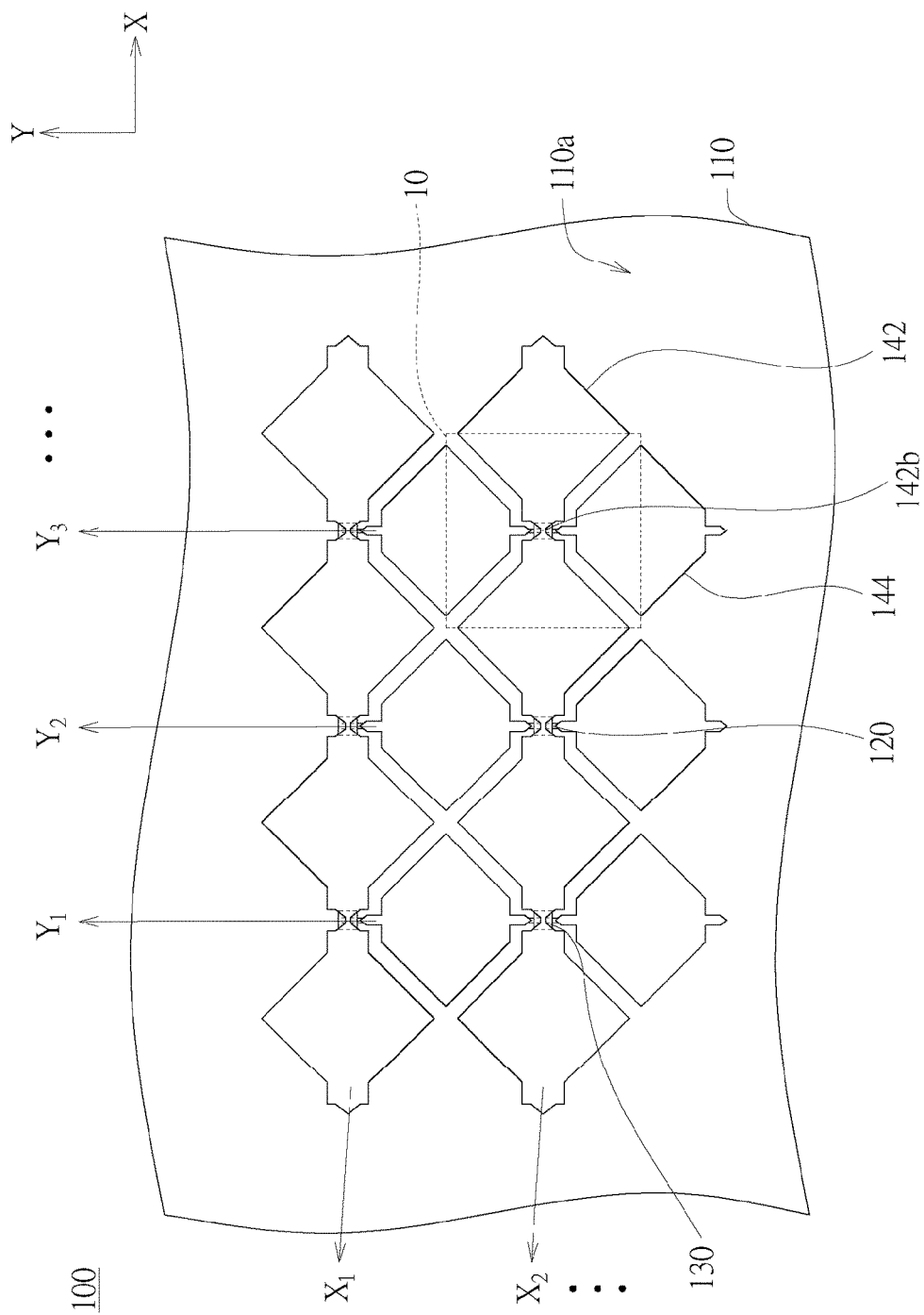
FIG. 1 is a top view of a touch panel according to an embodiment of the disclosure.

FIG. 1 is a top view of a touch panel 100 according to an embodiment of the disclosure.

Referring to FIG. 1, the touch panel 100 includes a substrate 110, a plurality of first electrode series X1, X2, . . . and a plurality of second electrode series Y1, Y2, Y3 . . . . The substrate 110 has a first surface 110a. The first electrode series X1, X2, . . . and the second electrode series Y1, Y2, Y3, . . . are disposed on the first surface 110a. Each of the first electrode series X1, X2, . . . extends along a first direction and includes a plurality of first electrodes 142. Each of the second electrode series Y1, Y2, Y3, . . . extends along a second direction and includes a plurality of second electrodes 144. The first direction is, for example, a direction X, and the second direction is, for example, a direction Y. The direction X and the direction Y may be perpendicular to each other. First bridge patterns 142b may exist between the first electrodes 142, and the first bridge patterns 142b connect the first electrodes 142 in each of the first electrode series X1, X2, . . . in series along the first direction. Second bridge patterns 120 may exist between the second electrodes 144, and the second bridge patterns 120 connect the second electrodes 144 in each of the second electrode series Y1, Y2, Y3, . . . in series along the second direction. Shapes of the first electrodes 142 and the second electrodes 144 may be different. The first electrode series X1, X2, . . . and the second electrode series Y1, Y2, Y3, . . . may be respectively electrically connected to a peripheral circuit (not shown), so that signals of the first electrodes 142 and the second electrodes 144 are output. In this embodiment, the first electrodes 142 are, for example, driving electrodes, and the second electrodes 144 are, for example, detection electrodes.

Figure 2A:
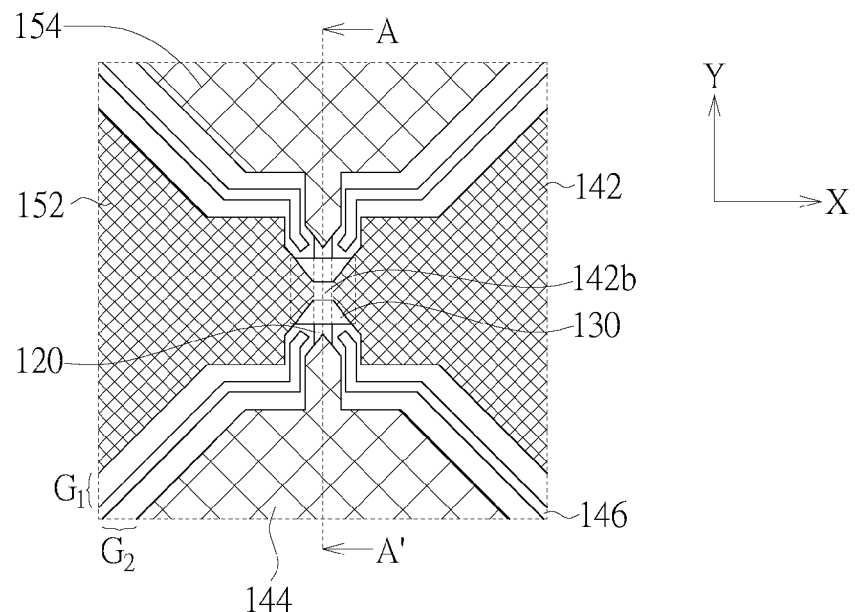
FIG. 2A is a top view of a sensing unit according to FIG. 1.
Figure 2B:
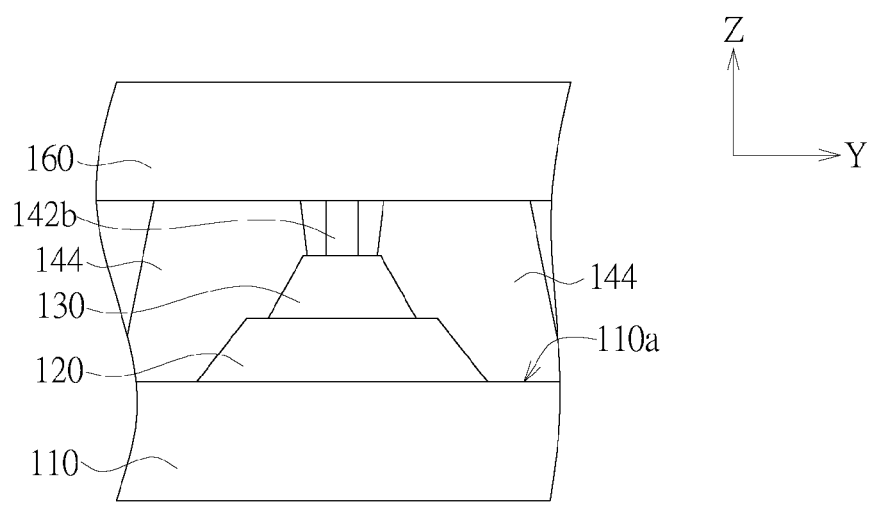
FIG. 2B is a cross-sectional view taken along a connection line A-A' of the sensing unit according to FIG. 2A.
Figure 2C:
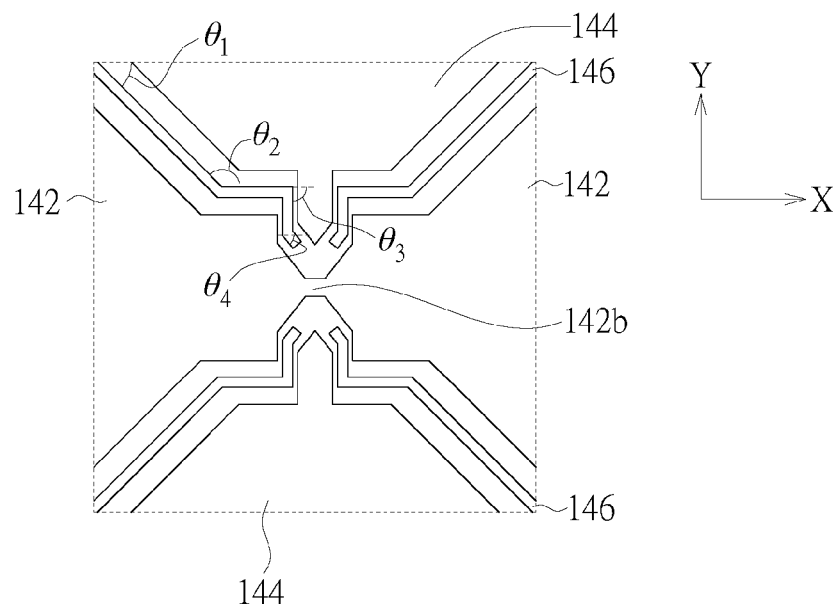
FIG. 2C is a top view of electrodes of a sensing unit according to FIG. 1.
Figure 2D:
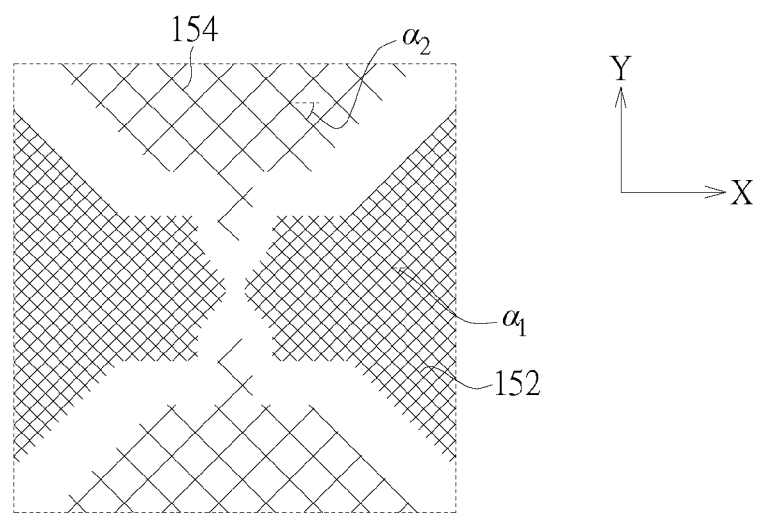
FIG. 2D is a top view of metal meshes of a sensing unit according to FIG. 1.
Figure 3:
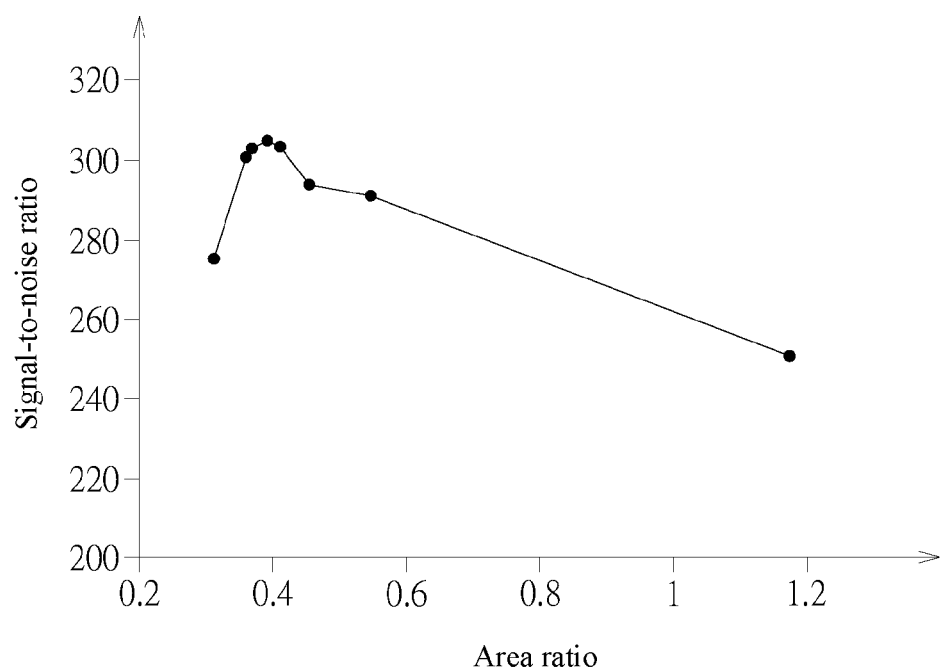
FIG. 3 is a relational diagram between an area ratio of each of first electrodes to each of second electrodes of a sensing unit and a signal-to-noise ratio (SNR) according to FIG. 1.

FIG. 2A is a top view of a sensing unit 10 according to FIG. 1. FIG. 2B is a cross-sectional view taken along a connection line A-A' of the sensing unit 10 according to FIG. 2A. FIG. 2C is a top view of electrodes (the first electrodes 142, the second electrodes 144, and imaginary-part electrodes 146) of the sensing unit 10 according to FIG. 1. FIG. 2D is a top view of metal meshes (first metal meshes 152 and second metal meshes 154) of the sensing unit 10 according to FIG. 1. FIG. 3 is a relational diagram between an area ratio of each of the first electrodes 142 to each of the second electrodes 144 of the sensing unit 10 and an SNR according to FIG. 1.

Referring to FIG. 2A and FIG. 2B, the first bridge patterns 142b enable the first electrodes 142 to be electrically connected to each other, and the second bridge patterns 120 enable the second electrodes 144 to be electrically connected to each other. An insulation layer 130 may exist between the first bridge patterns 142b and the second bridge patterns 120, so that each of the first electrodes 142 and each of the second electrodes 144 are electrically separated from each other. Each of the imaginary-part electrodes 146 may be disposed between each of the first electrodes 142 and each of the second electrodes 144. Each of the imaginary-part electrodes 146 may be separated from each of the first electrodes 142 and each of the second electrodes 144, and each of the imaginary-part electrodes 146, each of the first electrodes 142, and each of the second electrodes 144 are electrically insulated from each other. For example, each of the first electrodes 142 and each of the imaginary-part electrodes 146 are separated by a first gap G1. Each of the second electrodes 144 and each of the imaginary-part electrodes 146 are separated by a second gap G2. In comparison with a comparative example in which each of the first electrodes and each of the second electrodes are close to each other without having the imaginary-part electrode, each of the first electrodes 142 and each of the second electrodes 144 in the disclosure are separated by a relatively large gap, which may expand a range of distribution of power wires formed between the electrodes, and a finger touch sensing effect can still be achieved even if a thick cover lens (for example, glass having a thickness more than 3 mm) is used.

In this embodiment, the substrate 110 may be an LCM. The first electrodes 142 and the second electrodes 144 may be formed by a same material, for example, indium tin oxides (ITO), indium zinc oxide (IZO), or another transparent conductive material. Because the gap between each of the first electrodes 142 and each of the second electrodes 144 may cause a problem of visibility of electrode patterns caused by a refractive index difference (a refractive index difference caused by a transparent conductive material and air), each of the imaginary-part electrodes 146 is disposed between each of the first electrodes 142 and each of the second electrodes 144. Therefore, visibility of each of the first electrodes 142 and each of the second electrodes 144 is reduced. The imaginary-part electrodes 146 may be made of a material having a same refractive index as that of the first electrodes 142 and the second electrodes 144. In an embodiment, the material of the imaginary-part electrodes 146 may alternatively be the same as a material of the first electrodes 142 and the second electrodes 144, and the imaginary-part electrodes 146, the first electrodes 142, and the second electrodes 144 may be made in a same process, thereby reducing the costs.

In an embodiment, a material of the first bridge patterns 142b may be different from a material of the second bridge patterns 120. For example, the material of the first bridge patterns 142b may be a transparent conductive material that is the same as that of the first electrodes 142, and the first bridge patterns 142b and the first electrodes 142 may be an integrally molded structure formed by using a same process. The second bridge patterns 120 may be formed by a metal, for example, a metal layer formed by Ti/Al/Ti or Mo/Al/Mo. In comparison with a comparative example in which the second bridge patterns are formed by using a transparent conductive material, the second bridge patterns 120 in the disclosure may be formed by a metal.

In this embodiment, first metal meshes 152 and second metal meshes 154 may respectively cover the first electrodes 142 and the second electrodes 144. That is, the first metal meshes 152 and the second metal meshes 154 may be respectively electrically connected to the first electrodes 142 and the second electrodes 144. A cover lens 160 may cover the first metal meshes 152, the second metal meshes 154, the first electrodes 142, the second electrodes 144, and the imaginary-part electrodes 146. An air gap may exist between the cover lens 160, the first electrodes 142, and the second electrodes 144. In comparison with a comparative example in which the first electrodes and the second electrodes do not have the first metal meshes and the second metal meshes, because the first metal meshes 152 and the second metal meshes 154 in this embodiment respectively cover the first electrodes 142 and the second electrodes 144, resistance values of the first electrodes 142 and the second electrodes 144 decrease, which facilitates electrical conduction, may reduce the signal transmission time (RC loading), and may reduce visibility of the metal second bridge patterns.

Referring to FIG. 2A and FIG. 3, in this embodiment, in a unit area (for example, a unit area presented by the sensing unit 10) of the touch panel 100, a relationship between an area of each of the second electrodes 144 and an area of each of the first electrodes 142 may satisfy Formula 1 and Formula 2:

$$A_2 = R \times A_1 \quad \text{Formula 1; and}$$

$$0.37 < R < 0.41 \quad \text{Formula 2, where}$$

$A_1$ indicates the area of each of the first electrodes in the unit area, $A_2$ indicates the area of each of the second electrodes in the unit area, and R indicates a ratio of $A_2$ to $A_1$. The unit area corresponds to an area range touched by a user with a finger, for example, a unit area of a rectangle formed by sides each having a length of 5 to 7 mm.

In FIG. 3, an X axis indicates the ratio R of the area of each of the second electrodes 144 to the area of each of the first electrodes 142. A Y axis indicates an SNR. A higher SNR indicates a larger induction signal of the touch panel. In this embodiment, the cover lens 160 may be thick protective glass having a thickness of 3 to 5 mm. Therefore, impact caused by both the induction signal and the area ratio of electrodes on a capacitance value and a noise value needs to be considered. When the relationship between the area of each of the second electrodes 144 and the area of each of the first electrodes 142 satisfies the foregoing Formula 1 and Formula 2, the touch panel 100 may have an optimal induction signal.

Referring to FIG. 2C, the imaginary-part electrodes 146 have three or more imaginary-part electrode angles (for example, imaginary-part electrode angles $\theta_1$, $\theta_2$, $\theta_3$ and $\theta_4$), and the three or more imaginary-part electrode angles are different. For example, the imaginary-part electrode angle $\theta_1$ is not equal to the imaginary-part electrode angle $\theta_2$, the imaginary-part electrode angle $\theta_2$ is not equal to the imaginary-part electrode angle $\theta_3$, and the imaginary-part electrode angle $\theta_1$ is not equal to the imaginary-part electrode angle $\theta_3$. The imaginary-part electrode angles (for example, the imaginary-part electrode angles $\theta_1$, $\theta_2$, $\theta_3$ and $\theta_4$) are defined as an angle between bending edges of the imaginary-part electrodes 146 and an axis in a direction X. A sum of any two angles of the imaginary-part electrode angles (for example, the imaginary-part electrode angles $\theta_1$, $\theta_2$, $\theta_3$ and $\theta_4$) is greater than 90° and less than 270°. Proved by a human factors experiment, the number of electrode angles is in positive correlation with a visual effect. In comparison with a comparative example in which an appearance of each of the imaginary-part electrodes is not specially designed, because the imaginary-part electrodes 146 in the disclosure have three or more imaginary-part electrode angles, a better visual effect can be achieved, and visibility of electrode patterns of each of the first electrodes 142, each of the second electrodes 144 and each of the imaginary-part electrodes 146 is reduced.

Referring to FIG. 2D, each of the first metal meshes 152 and each of the second metal meshes 154 may respectively have a first mesh angle $\alpha_1$ and a second mesh angle $\alpha_2$. The first mesh angle $\alpha_1$ and the second mesh angle $\alpha_2$ may be the same, for example, may be 45°. Although after the first metal meshes 152 and the second metal meshes 154 cover the first electrodes 142 and the second electrodes 144, the entire resistance can be reduced and the burden of a driving integrated circuit (IC) can be reduced, when a nontransparent metal material is mounted in an LCM, an interference phenomenon is likely to be caused because periodic structures of both are added together, that is, a moiré effect. In the disclosure, the first mesh angle $\alpha_1$ and the second mesh angle $\alpha_2$ of each of the first metal meshes 152 and each of the second metal meshes 154 are adjusted to overcome a problem of the moiré effect. When the first mesh angle $\alpha_1$ and the second mesh angle $\alpha_2$ are 45°, the moiré effect may be the slightest.

In addition, the first mesh angle $\alpha_1$ and the second mesh angle $\alpha_2$ both are different from the imaginary-part electrode angles (for example, the imaginary-part electrode angles $\theta_1$, $\theta_2$, $\theta_3$ and $\theta_4$). In comparison with a comparative example in which shapes of the imaginary-part electrodes do not form a plurality of different angles and the imaginary-part electrode angles are the same as the metal mesh angles, because the imaginary-part electrodes 146 in this embodiment have three or more imaginary-part electrode angles that are different from each other, and the first mesh angle $\alpha_1$ and the second mesh angle $\alpha_2$ are different from the imaginary-part electrode angles (for example, the imaginary-part electrode angles $\theta_1$, $\theta_2$, $\theta_3$ and $\theta_4$), the visual effect can be improved. Therefore, human eyes are less likely to notice an edge of electrode patterns, and visibility of each of the metal second bridge patterns 120 can also be reduced.

In addition, the density of the first metal meshes 152 on the first electrodes 142 may be different from the density of the second metal meshes 154 on the second electrodes 144. In this embodiment, the density of the first metal meshes 152 on the first electrodes 142 may be greater than the density of the second metal meshes 154 on the second electrodes 144. A ratio of the density of the first metal meshes 152 on the first electrodes 142 to the density of the second metal meshes 154 on the second electrodes 144 is greater than 1 and less than 3.

Referring to Table 1 (as shown below), Table 1 shows that the number of points falling within a visible area of moiré in a first comparative example (the ratio of the density of the first metal meshes on the first electrodes to the density of the second metal meshes on the second electrodes is 1), a first experimental example (the ratio of the density of the first metal meshes 152 on the first electrodes 142 to the density of the second metal meshes 154 on the second electrodes 144 is 2), and a second comparative example (the ratio of the density of the first metal meshes on the first electrodes to the density of the second metal meshes on the second electrodes is 3) is measured by using an invisible curve of the moiré effect as a judgment criterion. A larger number of the points in the visible area of moiré indicates a more apparent interference stripe and a stronger moiré effect.

TABLE 1

| Group | First comparative example | First experimental example | Second comparative example |
|---|---|---|---|
| Number of points in visible area of moiré | 168 | 84 | 170 |

In comparison with the first comparative example and the second comparative example, the smaller number of the points falling within the visible area of moiré in the first experimental example indicates a relatively less apparent interference stripe. If a density difference of the metal meshes is excessively large, an interference effect may be affected again, and the visual effect is degraded. It can be learned that because the ratio of the density of the first metal meshes 152 on the first electrodes 142 to the density of the second metal meshes 154 on the second electrodes 144 in the disclosure is greater than 1 and less than 3, the interference phenomenon can be relieved, the moiré effect can be reduced, and a good visual effect can be achieved.

According to the foregoing descriptions, an embodiment of the disclosure provides a touch panel. In a unit area of the touch panel, the ratio of the area of each of the second electrodes to the area of each of the first electrodes is greater than 0.37 and less than 0.41. In comparison with a comparative example in which the area of each of the second electrodes is the same as the area of each of the first electrodes, the area ratio of each of the first electrodes to each of the second electrodes in the disclosure is specially designed. Even if thick glass (for example, glass having a thickness greater than 3 mm) is used as the cover lens, the touch panel can still have a high induction signal and a relatively low noise value, and have a good touch sensing quality. In addition, the second electrodes in the disclosure are connected by the metal second bridge patterns, and have a relatively high capability of withstanding high pressure in comparison with the comparative example of the second bridge patterns made of a transparent conductive material. Moreover, the first metal meshes and the second metal meshes that have different densities respectively cover the first electrodes and the second electrodes, each of the imaginary-part electrodes having the three or more angles is disposed between each of the first electrodes and each of the second electrodes, and the imaginary-part electrode angles are different from the angles of the first metal meshes and the second metal meshes. In this way, the RC loading can be reduced, visibility of the metal second bridge patterns and electrode patterns can also be reduced, and the moiré effect can be reduced. Therefore, the touch panel in the disclosure can withstand a relatively large external force and an inductive effect is also excellent, and a visual effect is not affected.

Based on the above, although the present invention has been disclosed by using the embodiments, the embodiments are not intended to limit the present invention. A person of ordinary skill in the art of the present invention may make various modifications and variations to the present invention without departing from the spirit and scope of the present invention. Therefore, the protection scope of the present invention should be defined by the appended claims.

What is claimed is:

1. A touch panel, comprising:
a substrate, having a first surface;
a plurality of first electrode series, disposed on the first surface, each of the first electrode series extending along a first direction and comprising a plurality of first electrodes, and each first electrode covers a unit area $A_1$;
a plurality of second electrode series, disposed on the first surface, each of the second electrode series extending along a second direction and comprising a plurality of second electrodes, and each second electrode covers a unit area $A_2$;
a plurality of imaginary-part electrodes, wherein each of the imaginary-part electrodes is disposed between each of the first electrodes and each of the second electrodes, each of the imaginary-part electrodes has three or more imaginary-part electrode angles, and the three or more imaginary-part electrode angles are different;
a plurality of first metal meshes electrically connected to the first electrodes; and
a plurality of second metal meshes electrically connected to the second electrodes;
wherein a ratio of $A_2$ to $A_1$ is between 0.37 and 0.41.

2. The touch panel according to claim 1, wherein the first electrodes, the second electrodes, and the imaginary-part electrodes are formed by materials having a same refractive index.

3. The touch panel according to claim 1, wherein each of the imaginary-part electrodes is separated from each of the first electrodes and each of the second electrodes, and each of the imaginary-part electrodes, each of the first electrodes, and each of the second electrodes are electrically insulated from each other.

4. The touch panel according to claim 1,
wherein the plurality of first metal meshes is disposed on the first electrodes and having a first mesh angle, and the first mesh angle is different from each of the three or more imaginary-part electrode angles; and
wherein the plurality of second metal meshes is disposed on the second electrodes and having a second mesh angle, and the second mesh angle is different from each of the three or more imaginary-part electrode angles.

5. A touch panel, comprising:
a substrate, having a first surface;
a plurality of first electrode series, disposed on the first surface, each of the first electrode series extending along a first direction and comprising a plurality of first electrodes, and each first electrode covers a unit area $A_1$;
a plurality of second electrode series, disposed on the first surface, each of the second electrode series extending along a second direction and comprising a plurality of second electrodes, and each second electrode covers a unit area $A_2$;
a plurality of imaginary-part electrodes, wherein each of the imaginary-part electrodes is disposed between each of the first electrodes and each of the second electrodes, each of the imaginary-part electrodes has three or more imaginary-part electrode angles, and the three or more imaginary-part electrode angles are different;
a plurality of first metal meshes having a first density on the first electrodes; and
a plurality of second metal meshes having a second density on the second electrodes, wherein the first density is different from the second density;
wherein a ratio of $A_2$ to $A_1$ is between 0.37 and 0.41.

6. A touch panel, comprising:
a substrate, having a first surface;
a plurality of first electrode series, disposed on the first surface, each of the first electrode series extending along a first direction and comprising a plurality of first electrodes, and each first electrode covers a unit area $A_1$;
a plurality of second electrode series, disposed on the first surface, each of the second electrode series extending along a second direction and comprising a plurality of second electrodes, and each second electrode covers a unit area $A_2$;
a plurality of imaginary-part electrodes, wherein each of the imaginary-part electrodes is disposed between each of the first electrodes and each of the second electrodes, each of the imaginary-part electrodes has three or more imaginary-part electrode angles, and the three or more imaginary-part electrode angles are different;
a plurality of first metal meshes having a first mesh angle of 45°; and
a plurality of second metal meshes having a second mesh angle of 45°;
wherein a ratio of $A_2$ to $A_1$ is between 0.37 and 0.41.

7. The touch panel according to claim 1, further comprising:
a plurality of first bridge patterns formed with a first material, connecting the first electrodes in series along the first direction; and
a plurality of second bridge patterns formed with a second material, connecting the second electrodes in series along the second direction;
wherein the first material is different from the second material.

8. The touch panel according to claim 7, wherein each of the second bridge patterns is formed by a metal.

* * * * *